(12) United States Patent
Ha et al.

(10) Patent No.: US 11,218,016 B2
(45) Date of Patent: Jan. 4, 2022

(54) ELECTRONIC DEVICE AND FREQUENCY INTERFERENCE CANCELLATION METHOD THEREOF

(71) Applicant: Samsung Electronics Co., Ltd., Gyeonggi-do (KR)

(72) Inventors: Youngmi Ha, Gyeonggi-do (KR); Hansol Choi, Gyeonggi-do (KR); Dongzo Kim, Gyeonggi-do (KR); Byungwook Kim, Gyeonggi-do (KR); Jaeho Song, Gyeonggi-do (KR); Dongik Sin, Gyeonggi-do (KR); Wooram Lee, Gyeonggi-do (KR); Sungjoon Cho, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 29 days.

(21) Appl. No.: 16/916,787

(22) Filed: Jun. 30, 2020

(65) Prior Publication Data
US 2021/0036539 A1 Feb. 4, 2021

(30) Foreign Application Priority Data
Jul. 31, 2019 (KR) .................. 10-2019-0092994

(51) Int. Cl.
*H01M 10/44* (2006.01)
*H01M 10/46* (2006.01)
(Continued)

(52) U.S. Cl.
CPC ............... *H02J 7/04* (2013.01); *H02J 50/10* (2016.02)

(58) Field of Classification Search
CPC .... H02J 7/04; H02J 50/10; H02J 50/80; H02J 50/005; H04L 25/03159; H02M 1/44
(Continued)

(56) References Cited

U.S. PATENT DOCUMENTS

2010/0244576 A1 9/2010 Hillan et al.
2014/0125138 A1 5/2014 Chen et al.
(Continued)

FOREIGN PATENT DOCUMENTS

JP 2015-056959 3/2015
KR 2011-0132604 12/2011
WO WO 2018/163177 9/2018

OTHER PUBLICATIONS

International Search Report dated Oct. 28, 2020 issued in counterpart application No. PCT/KR2020/009660, 4 pages.

*Primary Examiner* — Edward Tso
(74) *Attorney, Agent, or Firm* — The Farrell Law Firm, P.C.

(57) ABSTRACT

An electronic device and method are provided for frequency interference cancellation. The electronic device includes a coil, a wireless power receive circuit, a charging circuit, a display, and a processor. The processor may be configured to perform wireless charging with power wirelessly received from a wireless charger, change, via the charging circuit, a charging current of the electronic device from an initial current level to a first current level, based on the display being switched on during wireless charging, change, via the wireless power receive circuit, a charging voltage of the electronic device from an initial voltage level to a first voltage level, transmit, via the coil, a packet for changing a charging voltage of the wireless charger, change, via the wireless power receive circuit, the charging voltage of the electronic device to a second voltage level upon transmission of the packet, and change the charging current to the initial current level.

20 Claims, 7 Drawing Sheets

(51) Int. Cl.
*H02J 7/04* (2006.01)
*H02J 50/10* (2016.01)

(58) Field of Classification Search
USPC .................. 320/107, 108, 114, 152, 162, 164
See application file for complete search history.

(56) References Cited

U.S. PATENT DOCUMENTS

| | | |
|---|---|---|
| 2016/0197513 A1 | 7/2016 | Uchimoto et al. |
| 2016/0374049 A1 | 12/2016 | Ha et al. |
| 2017/0025887 A1 | 1/2017 | Hyun et al. |
| 2020/0076249 A1* | 3/2020 | Mao .................... H04B 5/0075 |
| 2020/0287419 A1 | 9/2020 | Sherman et al. |

* cited by examiner

ELECTRONIC DEVICE AND FREQUENCY INTERFERENCE CANCELLATION METHOD THEREOF

CROSS-REFERENCE TO RELATED APPLICATION(S)

This application is based on and claims priority under 35 U.S.C. § 119 to Korean Patent Application No. 10-2019-0092994, filed on Jul. 31, 2019, in the Korean Intellectual Property Office, the entire disclosure of which is incorporated herein by reference.

BACKGROUND

1. Field

The disclosure relates generally to an electronic device and a frequency interference cancellation method thereof, and more particularly to a wireless charging-enabled electronic device and an interference cancellation method thereof.

2. Description of the Related Art

Many types of electronic devices, such as smartphones, tablet personal computers (PCs), personal digital assistants (PDAs), laptop PCs, and wearable devices, are wireless charging-enabled. A wireless charging-enabled electronic device may charge its battery wirelessly. For example, a wireless charging-enabled electronic device receives charging power from another electronic device via magnetic induction coupling or magnetic resonant coupling without any cable connection between the electronic devices. A magnetic induction-based wireless charging system may charge a battery of a wireless power recipient device when contacted or placed in close proximity with a wireless power transfer device, e.g., a wireless charger.

When charging an electronic device using a wireless charger, an operating frequency of the wireless charger and an operating frequency of a component of the electronic device (e.g., a display or a pen) may interfere with each other. Such frequency interference may cause the component of the electronic device to malfunction.

While changing an operating voltage of the electronic device or the wireless charger may cancel the frequency interference between the electronic device and the wireless charger, it may also cause unnecessary wireless charging re-recognition or a cut-off of the wireless charging.

SUMMARY

According to an aspect of the disclosure, an electronic device is provided, which includes a coil, a wireless power receive circuit, a charging circuit, a display, and a processor. The processor is configured to perform wireless charging with power wirelessly received from a wireless charger, change, via the charging circuit, a charging current of the electronic device from an initial current level to a first current level, based on the display being switched on during the wireless charging, change, via the wireless power receive circuit, a charging voltage of the electronic device from an initial voltage level to a first voltage level, transmit, via the coil, a packet for changing a charging voltage of the wireless charger, change, via the wireless power receive circuit, the charging voltage of the electronic device to a second voltage level upon transmission of the packet, and change the charging current to the initial current level.

According to another aspect of the disclosure, a frequency interference cancellation method is provided for an electronic device. The method includes performing wireless charging using power wireless received from a wireless charger, changing a charging current of the electronic device from an initial current level to a first current level, changing a charging voltage of the electronic device from an initial voltage level to a first voltage level, transmitting a packet for changing a charging voltage of the wireless charger, changing the charging voltage of the electronic device to a second voltage level, response to transmitting the packet, and changing the charging current to the initial current level.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
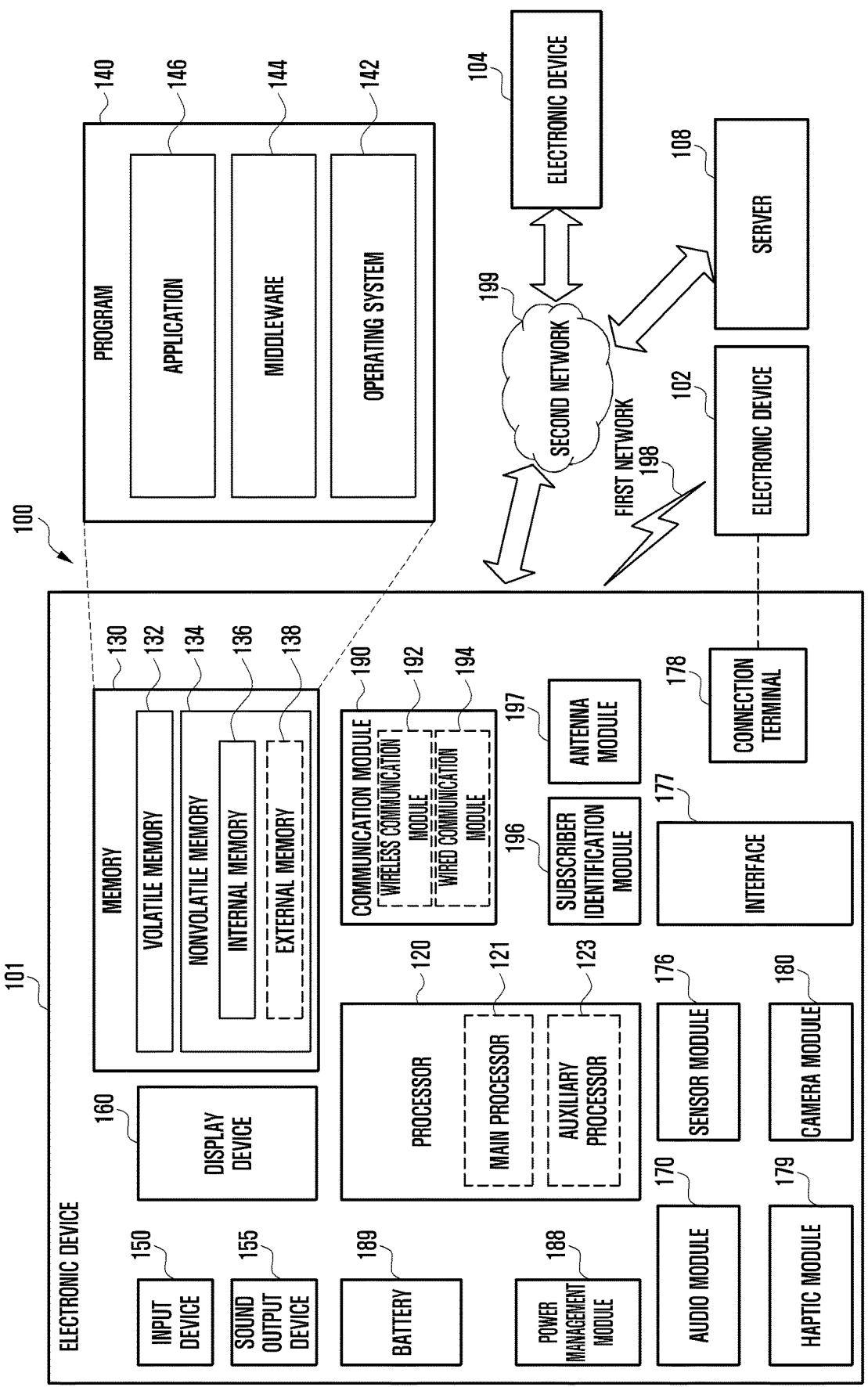
FIG. 1 is a block diagram illustrating an electronic device in a network environment according to an embodiment.

Hereinafter, various embodiments are described with reference to the accompanying drawings. The embodiments and the terms used herein are not intended to limit the disclosure to specific forms, and should be understood to include various modifications, equivalents, and/or alternatives to the corresponding embodiments.

In describing the accompanying drawings, similar reference numerals may be used to designate similar elements.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component the processor 120 of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RHO) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
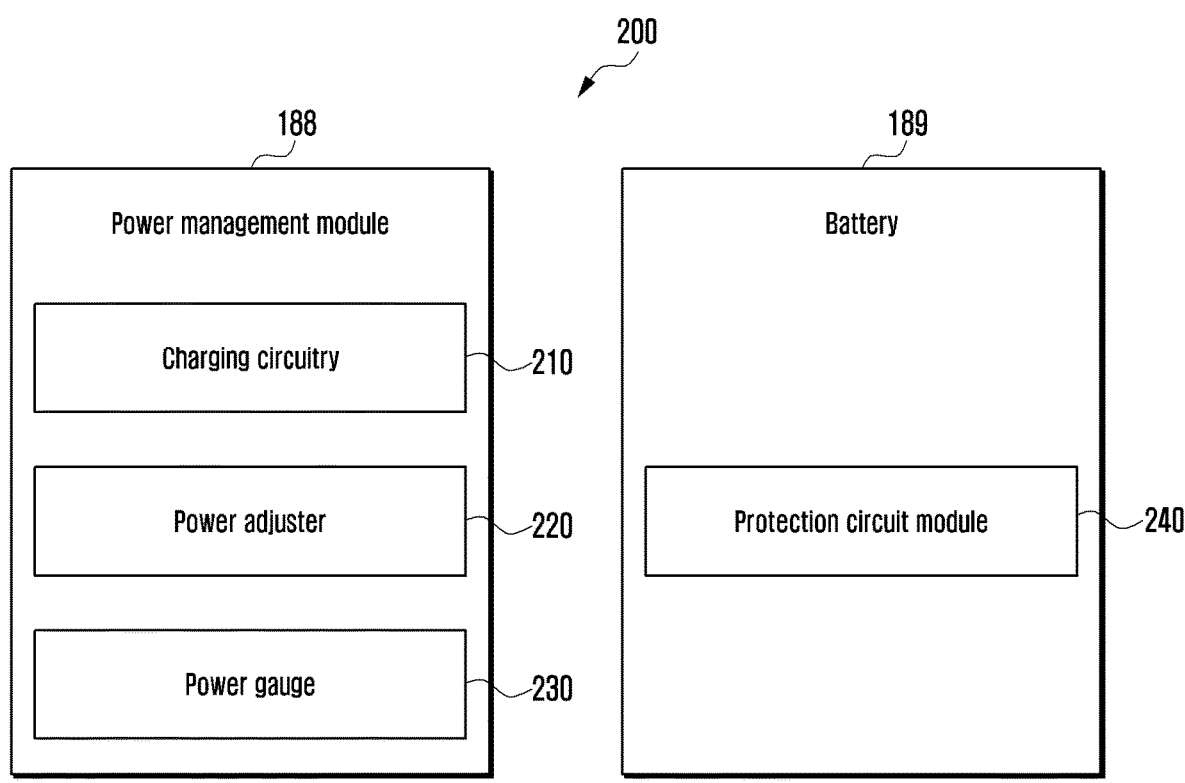
FIG. 2 is a block diagram illustrating a power management module and a battery according to an embodiment.

FIG. 2 is a block diagram 200 illustrating the power management module 188 and the battery 189 according to an embodiment.

Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watts or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
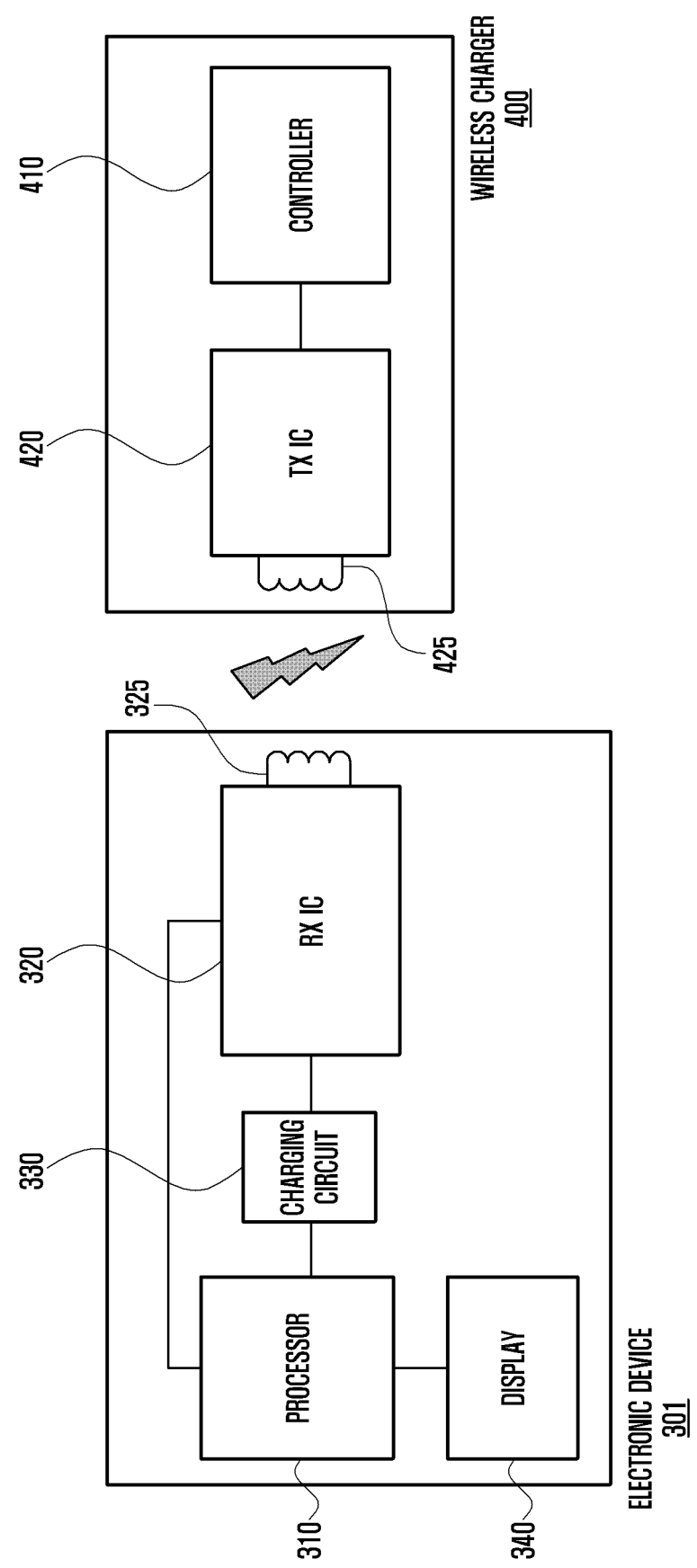
FIG. 3 is a block diagram illustrating an electronic device and a wireless charger according to an embodiment.

FIG. 3 is a block diagram illustrating an electronic device and a wireless charger according to an embodiment.

Referring to FIG. 3, the electronic device 301 (e.g., electronic device 101 in FIG. 1) may be charged via the wireless charger 400. For example, the electronic device 301 receives power wirelessly supplied from the wireless charger 400 to charge a battery therein.

Although the electronic device 301 and the wireless charger 400 are respectively depicted as a wireless power receive (Rx) device and a wireless power transmit (Tx) device in FIG. 3, the electronic device 301 may be capable of both wirelessly transmitting and receiving power.

The electronic device 301 includes a processor 310, a charging circuit (charger integrated circuit (IC) or wireless charging IC) 330, a wireless power receive circuit (or Rx IC) 320, and a display 340. The electronic device 301 may also include a battery or an input device. Some of the components illustrated in FIG. 3 may be omitted or replaced by other components without departing from the spirit of the disclosure.

The processor 310 may control other components of the electronic device 301 and/or perform communication-related arithmetic operations or data processing. The processor 310 may be operationally connected with the other components of the electronic device 301.

The Rx IC 320 may include a full bridge circuit. The Rx IC 320 may control the full bridge circuit to drive a rectifier (alternating current (AC)→direct current (DC)) in a wireless power receive mode. The Rx IC 320 may include a low-dropout regulator (LDO), and may regulate the rectified source voltage to adjust the output voltage (or charging voltage) to the charging circuit 330.

The Rx IC 320 may transfer (or output) a charging voltage set to a predetermined level to the charging circuit 330 under the control of the processor 310.

The Rx IC 320 may exchange information for wireless power transmission/reception with the wireless charger 400 via in-band communication in accordance with the wireless power consortium (WPC) standard (or in a non-standard way).

Using the in-band communication, the electronic device 301 and the wireless charger 400 may exchange information via frequency or amplitude modulation of a wireless power transfer signal during the wireless power transfer between a wireless charging coil 325 of the wireless power receive device (e.g., the electronic device 301 in FIG. 3) and a wireless charging coil 425 of the wireless power transmit device e.g., the wireless charger 400 in FIG. 3). The information may include identifiers (IDs) of the electronic device 301 and wireless charger 400 (e.g., a model name or identification information) or wireless charging operation-related information (e.g., transmitting/receiving power, voltage, and rectification information). The electronic device 301, as the wireless power receive device, may receive information related to its relative positioning with the wireless charger 400, as the wireless power transmit device. For example, the electronic device 301 may determine whether it is aligned on the wireless charger 400 in a vertical direction or a horizontal direction.

The electronic device 301 and the wireless charger 400 may communicate in an out-band communication manner. For example, the out-band communication may be performed based on a short range communication standard such as a near-field communication (NFC), Bluetooth™, or Wi-Fi independently of the wireless power signal.

The coil 325 may be formed as a spirally-wound conductive pattern on a printed circuit board (e.g., a flexible printed circuit board (FPCB)).

The charging circuit 330 may be responsible for receiving power from the Rx IC 320 and/or charging the battery with the power received wirelessly or via a wire. The charging circuit 330 may be configured with a charging current for wireless charging under the control of the processor 310. The charging circuit 330 may use the voltage from the Rx IC 320 as a charging voltage for wireless charging. The charging circuit 330 may charge the battery of the electronic device 301 with the charging voltage and current.

The Rx IC 320 may be configured with a threshold of the charging current for wireless charging under the control of the processor 310. In this case, the charging circuit 330 is configured with a predetermined charging current that is below the threshold level for wireless charging under the control of the processor 310.

The display 340 may display various screens under the control of the processor 310. The display 340 may be a liquid crystal display (LCD).

The input device may receive a command or data for use by a component of the electronic device 301 from outside the electronic device 301. The input device may include a digital pen (e.g., a stylus pen).

The wireless charger 400 includes a controller 310, a wireless power transmit circuit (Tx IC) 420, and a coil 425.

The controller 410 may control other components of the wireless charger 400 and/or perform communication-related arithmetic operations or data processing. The controller 410 may be operationally connected with the other components of the wireless charger 400. The controller 410 may be a micro controller unit (MCU).

The Tx IC 420 may include a full bridge circuit. For example, the Tx IC 420 may control the full bridge circuit to drive an inverter (DC AC) in a wireless power transmit mode.

The electronic device 301 and the wireless charger 400 may support at least one of an electromagnetic induction method, an electromagnetic resonance method, and a radio frequency (RE) wireless power transfer method.

The electronic device 301 and the wireless charger 400 may support various wireless power transfer standards that are based on the electromagnetic induction principle in which electricity is induced in a receiving coil under the influence of the magnetic field created by a wireless charging coil. The electromagnetic induction principle-based wireless power transfer standards may include the WPC standard or the power matters alliance (PMA) standard that specify wireless charging technologies based on the electromagnetic induction principle.

The electronic device 301 and the wireless charger 400 may support various wireless power transfer standards that are based on the electromagnetic resonance principle in which a wireless charging coil of a wireless power transmit device and a receiving coil of a wireless power receive are resonating at the same frequency in a close distance. The electromagnetic resonance principle-based wireless power transfer standards may include the alliance for wireless power (AFWP) standard that specifies wireless charging technologies based on the electromagnetic resonance principle.

The electronic device 301 and the wireless charger 400 contact each other or may be placed close to each other for wireless charging. For example, it may be necessary to maintain proper contact between the electronic device 301 and the wireless charger 400.

Herein, the phrase "wireless charging state" may refer to a state in which the electronic device 301 is receiving power, which is wirelessly transmitted by the coil 425 of the wireless charger 400, and charging its battery with the wirelessly received power.

In the wireless charging state, the electronic device 301 may perform in-band communication with the power charger 400 in accordance with a designated standard (e.g., WPC standard) in order to exchange information for wireless power transmission with the power charger 400. For example, a WPC standard-based wireless charging process may include a ping phase (or ping detection phase), an identification and configuration phase for establishing a connection for wireless power transfer, or a power transfer phase.

In the ping phase, a wireless power transmit device (e.g., the wireless charger 400) may transmit a ping signal to detect a wireless power receive device (e.g., the electronic device 301) close to the wireless power transmit device. For example, the Tx IC 420 of the wireless charger 400 may transmit the ping signal and, if the Rx IC 320 of the electronic device 301 receives the ping signal, the Rx IC 320 may transmit a response signal to the wireless charger 400. If the response signal is received in reply to the ping signal transmitted by the Tx IC 420 of the wireless charger 400, this determines the proximity of the electronic device 301. For example, the wireless charger 400 may transmit the ping signal to determine whether the electronic device 301 is placed on the wireless charger 400.

In the identification and configuration phase, the wireless power transmit device and the wireless power receive device may communicate to configure a power transfer amount, e.g., determine a designated wireless power to be transferred from the wireless charger 400 to the electronic device 301.

In the power transfer phase, the wireless charger 400 transfers the designated wireless power, e.g., wireless charging power, to the electronic device 301.

At least one of a scheme of executing an algorithm for adjusting the charging voltages of the electronic device 301 and the wireless charger 400 to be equal and a scheme of directly adjusting the operating frequency of the wireless charger 400 is applied to cancel the noise caused by the interference between the operating frequency of the wireless charger 400 and a component of the electronic device 301 (e.g., display 340).

The processor 310 of the electronic device 301 may identify an operating frequency of the wireless charger 400 and an operating frequency of the display 340 of the electronic device 301. The operating frequency may refer to a frequency at which a device is operating. The operating frequency of the wireless charger 400 may be a frequency at which the wireless charger 400 operates during the wireless charging operation, and the operating frequency of the display 340 may be a frequency at which the display 340 operates in the operating state (ON state). For example, if the display 340 is an LCD, the operating frequency of the display 340 may be an LCD scanning frequency.

The processor 310 may periodically check or continuously monitor the operating frequencies of the wireless charger 400 and the display 340. The processor 310 may check the operating frequency of the wireless charger 400 that is received from the Tx IC 420 of the wireless charger 400 during the wireless charging operation. The processor 310 may check the operating frequency of the display 340 while the display 340 is operating.

The processor 310 may determine whether the operating frequencies of the wireless charger 400 and the display 340 fall within an overlapping range that is vulnerable to frequency interference. If the operating frequencies of the wireless charger 400 and the display 340 overlap during the wireless charging operation, a frequency interference phenomenon (e.g., screen flickering) may occur.

Although the description is made using the display 340 as the component of the electronic device 301 that is interfered with for convenience of explanation in this embodiment, a frequency interference phenomenon may occur between the operating frequency of the wireless charger 400 and another component of the electronic device 301 during the wireless charging operation. For example, if an operating frequency of the wireless charger 400 overlaps with an operating frequency of a digital pen of the electronic device 301, this may cause frequency interference. If the operating frequencies of the wireless charger 400 and the digital pen overlap, this may cause touch sensitivity degradation.

The processor 310 may compare the operating frequencies of the wireless charger 400 and the display 340 to determine whether the operating frequencies of the wireless charger 400 and the display 340 fall within an overlapping range that is vulnerable to frequency interference. For example, if the difference between the two operating frequencies is less than a predetermined threshold, the processor 310 may determine that the two frequencies are in the overlapping range and are vulnerable to frequency interference. For example, if it is determined that the operating frequency of the wireless charger 400 is fixed to 128 kHz and the operating frequency of the display 340 is 138 kHz, the processor 310 may determine that the two frequencies are within the overlapping range that is vulnerable to frequency interference. The predetermined threshold may be set based on experimental data.

An algorithm may be used for adjusting the charging voltages of the electronic device 301 and the wireless charger 400 to be equal. For example, the processor 310 executes the algorithm for adjusting the charging voltages of the electronic device 301 and the wireless charger 400 to be equal based on the two frequencies being in the overlapping range that is vulnerable to frequency interference. The processor 310 may change the wireless charging current from an initial current level to a first current level using the charging circuit 330, based on the two frequencies being in the overlapping range vulnerable that is to frequency interference.

The Rx IC 320 may be configured with a threshold of the wireless charging current under the control of the processor 310.

The charging circuit 330 may change the wireless charging current to the first current level that is less than a predetermined threshold under the control of the processor 310. For example, the processor 310 may control the charging circuit 330 to change the charging current from an initial current level to the first current level. The initial current level may be a default current for wireless charging or a charging current set by the user. The charging current may be set by the user when the electronic device is configured to allow its charging current to be changed or the wireless charger allows the user to set a proper charging current. The first current level may be a minimum current (e.g., 500 mA) capable of performing wireless charging with a minimum influence of a current load. The influence of the current load may refer to the influence of the current load to the quality of wireless charging.

The processor 310 may change the wireless charging voltage of the electronic device 301 from an initial voltage level to a first voltage level using the Rx IC 320. For example, the processor 310 may control the Rx IC 320 to set the wireless charging voltage output from the Rx IC 320 to the charging circuit 330 to the first voltage level. The processor 310 may adjust the charging voltage level of the electronic device 301 by adjusting the voltage from the Rx IC 320. For example, the charging circuit 330 may perform charging with the charging voltage from the Rx IC 320. The initial voltage level may be a default voltage level for wireless charging or a charging voltage set by the user. The first voltage level may be a voltage being determined between a target voltage level (e.g., a second voltage level) for frequency interference phenomenon avoidance and the initial voltage level. The first voltage level may be an intermediate voltage between the initial voltage level and the target voltage level. For example, if the initial voltage level is 10 V and the target voltage level (e.g., the second voltage level) is 5 V, the first voltage level may be 7 V.

The processor 310 may change the charging voltage of the electronic device 301 by using the Rx IC 320 in a stepwise manner based on a predetermined voltage. For example, if the initial voltage level is 10 V and the first voltage level is 7 V, the processor 310 may control the Rx IC 320 to change the charging voltage by 1 V to decrease the charging voltage in the order of 10 V>9 V>8 V>7V gradually (in a stepwise manner). By changing the charging voltage of the electronic device 301 gradually (or in a stepwise manner), unnecessary wireless charging re-recognition or a cut-off of wireless charging may be avoided, thereby improving wireless charging stability.

The processor 310 may wait until a predetermined time period elapses from the change of the charging voltage to the first voltage level. For example, the processor 310 may wait 1 second before the voltage stabilization between the electronic device 301 and the wireless charger 400.

The processor 310 may transmit a packet for changing the charging voltage of the wireless charger 400 to the wireless charger 400 by using the coil 325 upon elapse of the predetermined time period from the change of the change of the charging voltage to the first voltage level. The processor 310 of the electronic device 301 may control the Rx IC 320 to transmit and receive packets with the wireless charger 400 by using the coil 325. The processor 310 may transmit, to the wireless charger 400, a packet for changing the voltage of the wireless charger 400. For example, the processor 310 may transmit, to the wireless charger 400, a packet modulated using frequency-shift keying (FSK). The processor 310 may transmit, to the wireless charger 400, a packet for decreasing the charging voltage of the wireless charger 400. The packet may change the charging voltage of the wireless charger 400 to a predetermined voltage that can be equal to the target voltage level (e.g., a second voltage level) of the electronic device 301. The processor 310 may transmit, to the wireless charger 400, the packet for changing the charging voltage of the wireless charger 400 one or more times.

The controller 410 of the wireless charger 400 may change the charging voltage of the wireless charger 400 based on receiving the packet for changing the charging voltage of the wireless charger 400 from the electronic device 301 by using the coil 425. For example, the controller 410 may control the Tx IC 420 to change the charging voltage of the wireless charger 400 to the voltage indicated by the packet.

The processor 310 may change the charging voltage of the electronic device 301 to the second voltage level via the Rx IC 320 upon transmission of the packet for changing the charging packet of the wireless charger 400 to the wireless charger 400. For example, the processor 310 may control the Rx IC 320 to change the charging voltage of the electronic device 301 from the first voltage level to the second voltage level upon transmission of the packet to the wireless charger 400. The processor 310 may control the Rx IC 320 to change the charging voltage of the electronic device 301 in a stepwise manner by a predetermined voltage interval. For example, if the first and second voltage levels are respectively 7 V and 5 V, the processor 310 may control the Rx IC 320 to change the charging voltage by a voltage interval of 1 V, such that the charging voltage decreases in the order of 7 V>6 V>5 V gradually (in a stepwise manner).

The processor 310 may change the charging current of the electronic device 301 to the initial current level via the charging circuit 330. For example, if the charging voltage has been changed to the second voltage level as the target voltage level, the processor 310 may control the charging circuit 330 to change the charging current from the first current level back to the initial current level.

When the charging voltages of the electronic device 301 and the wireless charger 400 are changed to the second voltage level using the algorithm as described above, the electronic device 301 may perform the wireless charging operation with the charging voltage of the second voltage level. Accordingly, a frequency interference phenomenon may be avoided and the noise caused by frequency interference may be minimized by changing or equalizing the charging voltages of the electronic device 301 and the wireless charger 400.

If the operating frequency of the wireless charger 400 is variable, rather than fixed, then it may be possible to decrease the wireless charging power by decreasing the charging voltages of the electronic device 301 and the wireless charger 400. For example, if the wireless charging power varies according to the position of the electronic device 301 placed on the wireless charger 400, the operating frequency may be changed. If the wireless charging power decreases, the operating frequency of the wireless charger 400 may increase. Accordingly, a frequency interference phenomenon may be avoided and/or noise occurrence caused by frequency interference may be minimized by increasing the operating frequency of the wireless charger 400 by decreasing the charging voltages of the electronic device 301 and the wireless charger 400. For example, assuming that the operating frequency of the display 340 is 138 kHz and the operating frequency of the wireless charger 400 is variable in the range from 100 to 120 kHz, if the charging voltages of the electronic device 301 and the wireless charger 400 are decreased, the wireless charging power decreases, which may increase the operating frequency of the wireless charger 400 to 148 kHz. This may cancel the frequency interference between the operating frequencies of the wireless charger 400 and the display 340.

If the operating frequency of the wireless charger 400 is fixed, it may be possible to decrease the wireless charging power by changing the charging voltages of the electronic device 301 and the wireless charger 400, which reduces the strength of the noise caused by frequency interference, thereby minimizing frequency interference noise.

The operating frequency of the wireless charger 400 may be directly adjusted. More specifically, the processor 310 may transmit a packet for changing the operating frequency of the wireless charger 400 via the coil 325 for directly adjusting the operating frequency of the wireless charger 400. The processor 310 may determine whether the operating frequency of the wireless charger 400 is variable or fixed. The processor 310 may receive information on the operating frequency of the wireless charger 400 from the wireless charger 400 by using the coil 325 and determine whether the operating frequency of the wireless charger 400 is variable based on the received information.

The processor 310 may transmit, to the wireless charger 400, a packet for changing the operating frequency of the wireless charger 400 by using the coil 325 based on the operating frequency of the wireless charger 400 being variable. The packet for changing the operating frequency of the wireless charger 400 may change the operating frequency of the wireless charger to a frequency free from occurrence of frequency interference. For example, if the operating frequency of the display 340 is 138 kHz and the operating frequency of the wireless charger 400 is 128 kHz, the packet may change the operating frequency of the wireless charger 400 to 120 kHz in order to avoid the frequency interference phenomenon. The processor 310 may transmit the packet for changing the operating frequency of the wireless charger 400 one or more times.

The wireless charger 400 may change its operating frequency, upon receipt of the packet.

The processor 310 may control the charging circuit 330 to initialize the charging voltage and charging current to an initial voltage level if the display 340 powers off. The processor 310 may change the charging voltage of the charging circuit 330 back to the initial charging voltage and change the charging current of the charging circuit 330 back to the initial charging current. In this case, the processor 310 may transmit, to the wireless charger 400, a packet for changing the operating frequency and the charging voltage of the wireless charger 400 to the initial setting values. The wireless charger 400 may change its operating frequency and charging voltage back to the initial setting values upon receipt of the packet.

Figure 4:
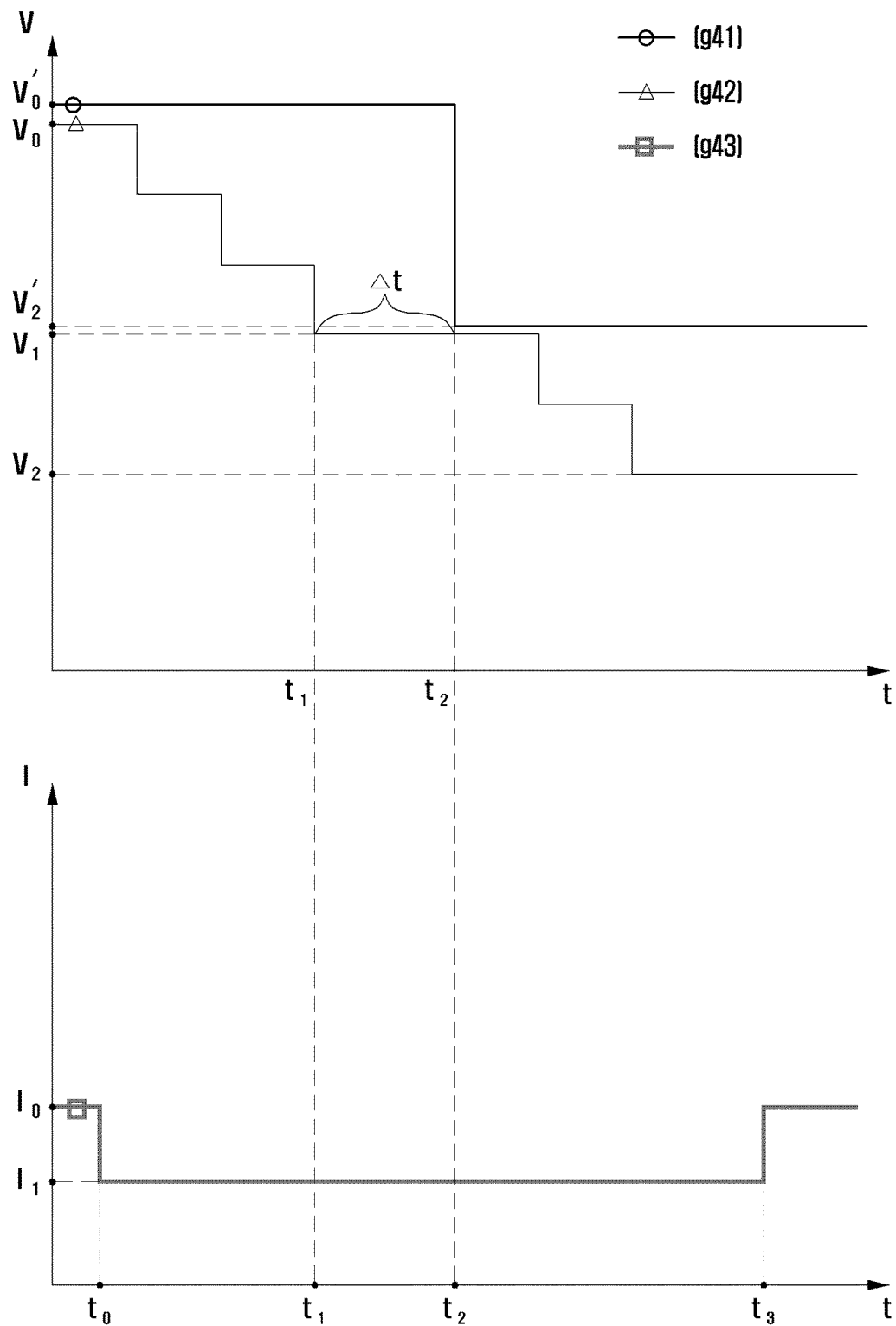
FIG. 4 illustrates graphs showing variations of a charging voltage of an electronic device and a wireless charger and variations of a charging current of the electronic device over time according to an embodiment.

FIG. 4 illustrates graphs showing variations of a charging voltage of an electronic device and a wireless charger and variations of a charging current of the electronic device over time according to an embodiment. Specifically, FIG. 4 illustrates the variations of the charging voltages of the electronic device 301 and the wireless charger 400 and the variation of charging current of electronic device 301 when executing an algorithm for adjusting the charging voltages of the electronic device 301 and the wireless charger 400 to be equal.

Referring to FIG. 4, graph g41 shows the variation of charging voltage of the wireless charger 400 over time, graph g42 shows the variation of the charging voltage of the electronic device 301 over time, and graph g43 shows the variation of the charging current of the electronic device 301.

The electronic device 301 may be wirelessly charged with the power wirelessly received from the wireless charger 400. During wireless charging, the wireless charging voltage of the electronic device 301 may be set to an initial voltage level $V_0$, and the wireless charging voltage of the wireless charger 400 may be set to a voltage $V_0'$. $V_0$ and $V_0'$ are voltages determined for wireless charging and equal to each other for wireless charging stability. During wireless charging, the wireless charging current of the electronic device 301 may be set to an initial current level $I_0$.

The processor 310 may identify the operating frequencies of the wireless charger 400 and the display 340 and determine whether the operating frequencies of the wireless charger 400 and the display 340 fall within an overlapping range that is vulnerable to frequency interference.

The processor 310 may execute the algorithm for changing the charging voltage of the electronic device 301 to a target voltage level $V_2$ and the charging voltage of the wireless charger 400 to a target voltage level $V_2'$ based on the operating frequencies of the wireless charger 400 and the display 340 falling within the overlapping range that is vulnerable to frequency interference. The processor 310 may also change the charging current $I_0$ of the electronic device 301 to a first current level $I_1$ at a time $t_0$, based on the operating frequencies of the wireless charger 400 and the display 340 falling within the overlapping range that is vulnerable to frequency interference. For example, the first current level $I_1$ may be a minimum current for wireless charging with minimum influence of a current load.

The processor 310 may change the charging voltage of the electronic device 301 from the initial voltage level $V_0$ to the first voltage level $V_1$. The processor 310 may change the charging voltage of the electronic device 301 gradually by a predetermined voltage interval. For example, if the initial voltage level $V_0$ is 10 V and the first voltage level $V_1$ is 7 V, the processor may control the Rx IC 320 to change the charging voltage by a voltage interval of 1 V such that the charging voltage decreases in the order of 10 V>9 V>8 V>7 V gradually (in a stepwise manner).

The processor 310 may wait until a predetermined time period $\Delta t$ elapses after the time point $t_1$ at which the charging voltage of the electronic device 301 changed to the first voltage level. For example, the processor 310 may wait for the predetermined time period $\Delta t$ before the voltage stabilization between the electronic device 301 and the wireless charger 400.

The processor 310 may transmit, to the wireless charger 400, a packet for changing the charging voltage of the wireless charger 400 by using the coil 325 at a time point $t_2$, upon elapse of the predetermined time period $\Delta t$ from the change of the charging voltage to the first voltage level. The packet for changing the charging voltage of the wireless charger 400 may change the charging voltage of the wireless charger 400 from $V_0'$ to $V_2'$. $V_2'$ may be a voltage that can be equal to the second voltage level $V_2$ as the target voltage level of the electronic device 301. The processor 310 may transmit, to the wireless charger 400, the packet for changing the charging voltage of the wireless charger 400 one or more times.

The processor 310 may change the charging voltage of the electronic device 301 from the first voltage level $V_1$ to the second voltage level $V_2$ upon transmission of the packet for changing the charging voltage of the wireless charger 400.

The processor 310 may control the Rx IC 320 to change the charging voltage of the electronic device 301 from the first voltage level $V_1$ to the second voltage level $V_2$ immediately after transmitting the packet to the wireless charger 400. The processor 310 may change the charging voltage of the electronic device 301 in a stepwise manner by a predetermined voltage interval. For example, if the first voltage level $V_1$ is 7 V and second voltage level $V_2$ is 5 V, the processor 310 may control the Rx IC 320 to change the charging voltage by a voltage interval of 1 V such that the charging voltage decreases in the order of 7 V>6 V>5 V gradually (in a stepwise manner).

The processor 310 may change the charging current of the electronic device 301 from the first current level $I_1$ to the initial current level $I_0$ at a time point $t_3$. For example, after the charging voltage has been changed to the second voltage level $V_2$ as the target voltage level, the processor 310 may control the charging circuit 330 to change the charging current from the first current level $I_1$ back to the initial current level $I_0$.

The charging circuit 330 may charge the battery of the electronic device 301 with the initial current level $I_0$ and the second voltage level $V_2$ under the control of the processor 310.

If the display 340 powers off during the algorithm run, the processor 310 may control to the charging current and voltage of the electronic device 101 to change back the initial charging current and voltage. The processor 310 may transmit a packet for changing the charging voltage of the wireless charger 400 back to the initial charging voltage.

Figure 5:
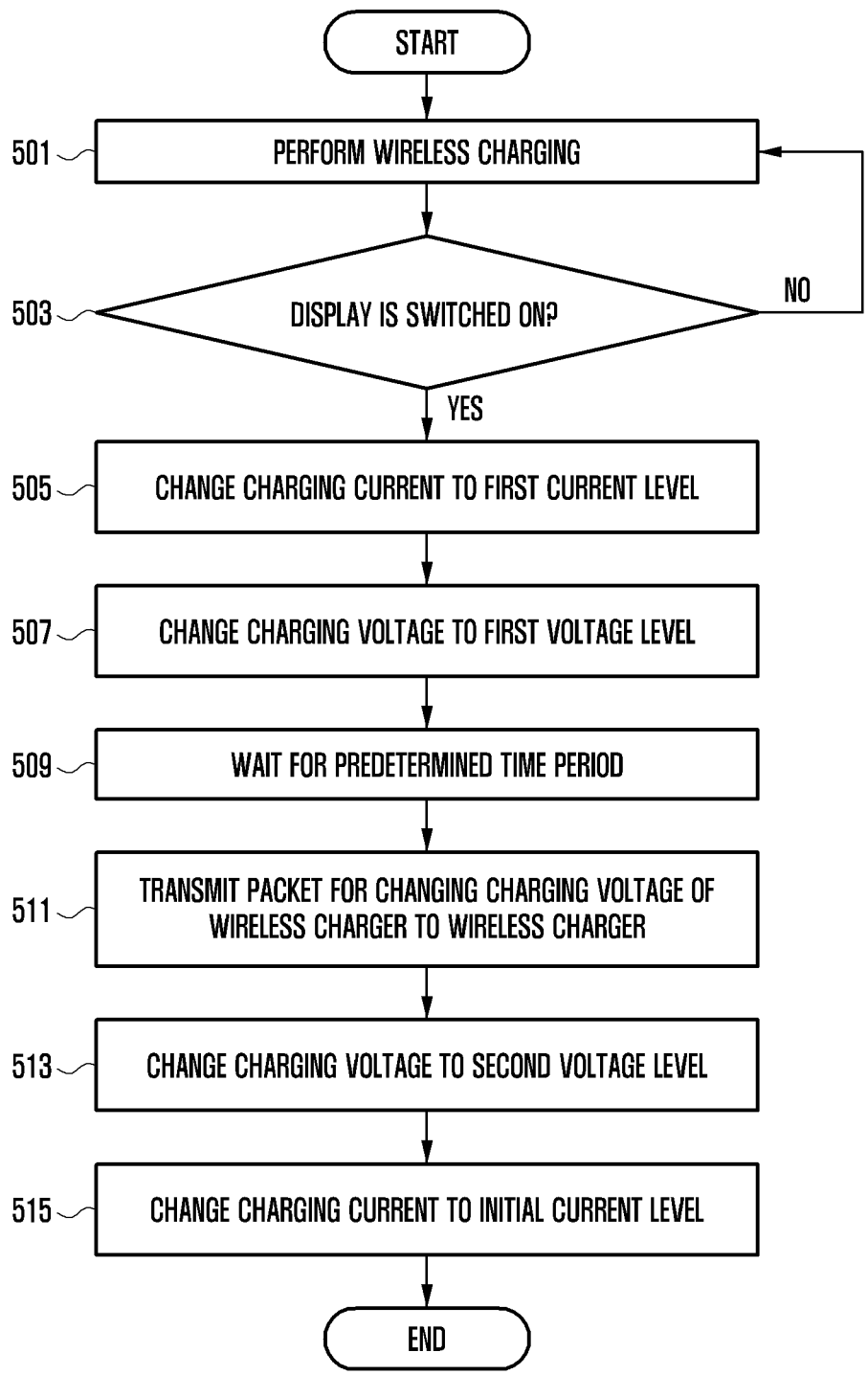
FIG. 5 is a flowchart illustrating a frequency interference cancellation method of an electronic device according to an embodiment.

FIG. 5 is a flowchart illustrating a frequency interference cancellation method of an electronic device according to an embodiment. Specifically, FIG. 5 illustrates a frequency interference cancellation method of using an algorithm for adjusting charging voltages of the electronic device 301 and the wireless charger 400 to be equal.

Referring to FIG. 5, in step 501, the processor 310 performs wireless charging with power that is wirelessly received from the wireless charger 100. The processor 310 may receive the power from the wireless charger 400 and charge the battery of the electronic device 301 with the received charging voltage. The processor 310 may set the wireless charging current of the electronic device 301 to an initial current level. The processor 310 may control the Rx IC 320 to set the wireless charging voltage of the electronic device 301 to an initial voltage level. The initial current level and the initial voltage level may be default values configured for wireless charging.

In step 503, the processor 310 determines whether the display is in the ON state during wireless charging. The processor 310 may determine whether the display is switched on during wireless charging, or whether the display 340 is switched from the OFF state to the ON state during wireless charging.

If it is determined that the display is not in the ON state in step 503, the processor 310 maintains wireless charging with the power from the wireless charger 400 in step 501. The processor 310 may perform wireless charging with the charging voltage set to the initial voltage level and the charging current set to the initial current level.

However, if the display is switched on during wireless charging in step 503, the processor 310 changes the charging current of the electronic device from the initial current level to the first current level via the charging circuit 330 in step 505.

In step 507, the processor 310 changes the charging voltage from the initial voltage level to the first voltage level via the Rx IC 320. The processor 310 may send the Rx IC 320 a setting value for setting the charging voltage (or output voltage), which is output from the Rx IC 320 to the charging circuit 330, to the first voltage level. The charging voltage of the electronic device 301 for charging the battery of the electronic device 301 may be adjusted by regulating a level of the voltage output form the charging circuit 330. The processor 310 may change the charging voltage of the electronic device 301 gradually (or in a stepwise manner) by a predetermined voltage interval via the Rx IC 320.

In step 509, the processor 310 waits until a predetermined time period elapses from changing the charging voltage of the electronic device 301 to the first voltage level. The processor 310 may wait for a predetermined time period (e.g., 1 second) before voltage stabilization between the electronic device 301 and the wireless charger 400.

In step 511, the processor 310 transmits, to the wireless charger 400, a packet for changing the charging voltage of the wireless charger 400, upon elapse of the predetermined time period. The wireless charger 400 may change its charging voltage upon receipt of the packet.

In step 513, the processor 310 changes the charging voltage of the electronic device 301 from the first voltage level to the second voltage level via the Rx IC 320. The processor 310 may send the Rx IC 320 a setting value for setting the charging voltage (or output voltage), which is output from the Rx IC 320 to the charging circuit 330, to the second voltage level. The processor 310 may change the charging voltage of the electronic device 301 gradually (or in a stepwise manner) by a predetermined voltage interval.

In step 515, the processor changes the charging current of the electronic device 301 from the first current level to the initial current level via the charging circuit 330. If the charging voltage of the electronic device 301 is changed to the second voltage level as the target voltage level and equal to the charging voltage of the wireless charger 400, the processor 310 may control the charging circuit 330 to change the charging current of the electronic device 301 back to the initial charging current level.

The processor 310 may continue wireless charging while the charging voltage of the electronic device 301 has been changed to the second voltage level.

Figure 6:
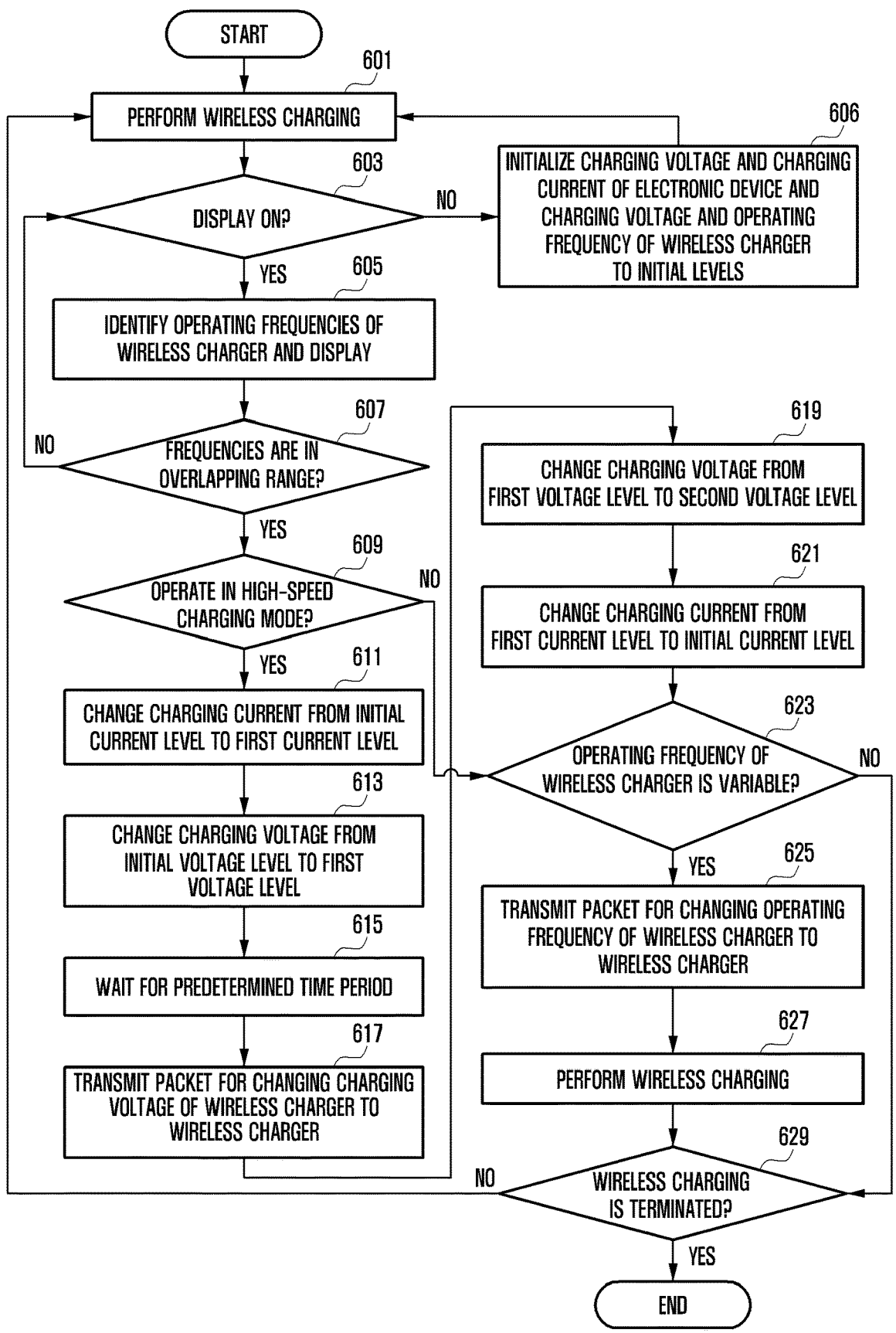
FIG. 6 is a flowchart illustrating a frequency interference cancellation method of an electronic device according to an embodiment.

FIG. 6 is a flowchart illustrating a frequency interference cancellation method of an electronic device according to an embodiment. Specifically, FIG. 6 illustrates a frequency interference cancellation method that uses an algorithm to adjust charging voltages of the electronic device 301 and the wireless charger 400 to be equal and that directly adjusts the operating frequency of the wireless charger 400. Detailed descriptions of steps overlapping with those made with reference to FIG. 5 are omitted below.

Referring to FIG. 6, in step 601, the processor 310 performs wireless charging with power that is wirelessly received from the wireless charger 400. The processor 310 may set the wireless charging current of the electronic device 301 to an initial current level via the charging circuit 330. The processor 310 may set the wireless charging voltage of the electronic device 301 to an initial voltage level.

In step 603, the processor 310 determines whether the display 340 is in the ON state. The processor 310 may determine whether the display 340 is switched on during wireless charging, or whether the display 340 is switched from the OFF state to the ON state during wireless charging.

If it is determined that the display 340 is not in the ON state (if the display 340 is in the OFF state) in step 603, in step 606, the processor 310 sets the charging voltage and charging current of the electronic device 301 to initial setting values and transmits, to the wireless charger 400, a packet for setting the charging voltage and operating frequency of the wireless charger 400 to initial setting values.

If it is determined that the display 340 is in the ON state in step 603, the processor 310 may identifies the operating frequencies of the wireless charger 400 and the display 340 in step 605. The processor 310 may frequently check or continuously monitor the operating frequencies of the wireless charger 400 and the display 340.

In step 607, the processor 310 determines whether the operating frequencies of the wireless charger 400 and the display 340 fall within an overlapping range that is vulnerable to frequency interference.

If it is determined that the operating frequencies of the wireless charger 400 and the display 340 do not fall within the overlapping range in step 607, the processor 310 determines again whether the display is in the ON state in step 603. If the two operating frequencies do not fall within the overlapping range, there is no noise caused by any frequency interference and, in this case, the processor 310 does not execute the algorithm for adjusting the charging voltages of the electronic device 301 and the wireless charger 400 to be equal.

If it is determined that the operating frequencies of the charger 400 and the display 340 fall within the overlapping range that is vulnerable to frequency interference in step 607, the processor 310 determines whether wireless charging is being performed in a high-speed wireless charging mode in step 609.

Alternatively, step 609 may be omitted. In this case, if it is determined that the operating frequencies of the charger 400 and the display 340 fall within the overlapping range in step 607, the processor 310 changes the charging current of the electronic device 301 from the initial current level to the first current level in step 611. The processor 310 may control the charging circuit 330 to set the charging current of the electronic device 301 to the first current level.

If it is determined that wireless charging is performed in a normal mode rather than the high-speed wireless charging mode in step 609, the processor 310 determines whether the operating frequency of the wireless charger 400 is variable in step 623. However, if it is determined that wireless charging is performed in the high-speed wireless charging mode in step 609, the processor 310 changes the charging current of the electronic device 301 from the initial current level to the first current level via the charging circuit 330 in step 611.

In step 613, the processor 310 changes the charging voltage of the electronic device 301 from the initial voltage level to the first voltage level. The processor 310 may change the charging voltage of the electronic device 301 gradually (or in a stepwise manner) by a predetermined voltage interval.

In step 615, the processor 310 waits for a predetermined time period to elapse after changing the charging voltage of the electronic device 301 to the first voltage level.

After the predetermined time period to elapses, in step 617, the processor 310 transmits, to the wireless charger 400, using the coil 325, a packet for changing the charging voltage of the wireless charger 400.

In step 619, the processor 310 changes the charging voltage of the electronic device 301 from the first voltage level to the second voltage level via the Rx IC 320. The processor 310 may change the charging voltage of the electronic device 301 gradually (or in a stepwise manner) by a predetermined voltage interval via the Rx IC 320.

In step 621, the processor 310 changes the charging current of the electronic device 301 from the first current level to the initial current level.

In step 623, the processor 310 determines whether the operating frequency of the wireless charger 400 is variable or fixed.

If it is determined that the operating frequency of the wireless charger 400 is variable in step 623, the processor transmits, to the wireless charger 400, a packet for changing the operating frequency of the wireless charger 400 in step 625.

In step 627, the processor 310 performs wireless charging with the charging voltage of the wireless charger 400 being equal to the second voltage level of the electronic device 301. Thereafter, or if it is determined that the operating frequency of the wireless charger is fixed in step 623, the processor 310 determines whether wireless charging with the power from the wireless charger 400 is terminated in step 629.

If it is determined that wireless charging is still in progress in step 629, the procedure returns to step 601 and the processor 310 continues wireless charging with the power from the wireless charger 400. However, if it is determined that wireless charging is terminated in step 629, the procedure ends.

Figure 7:
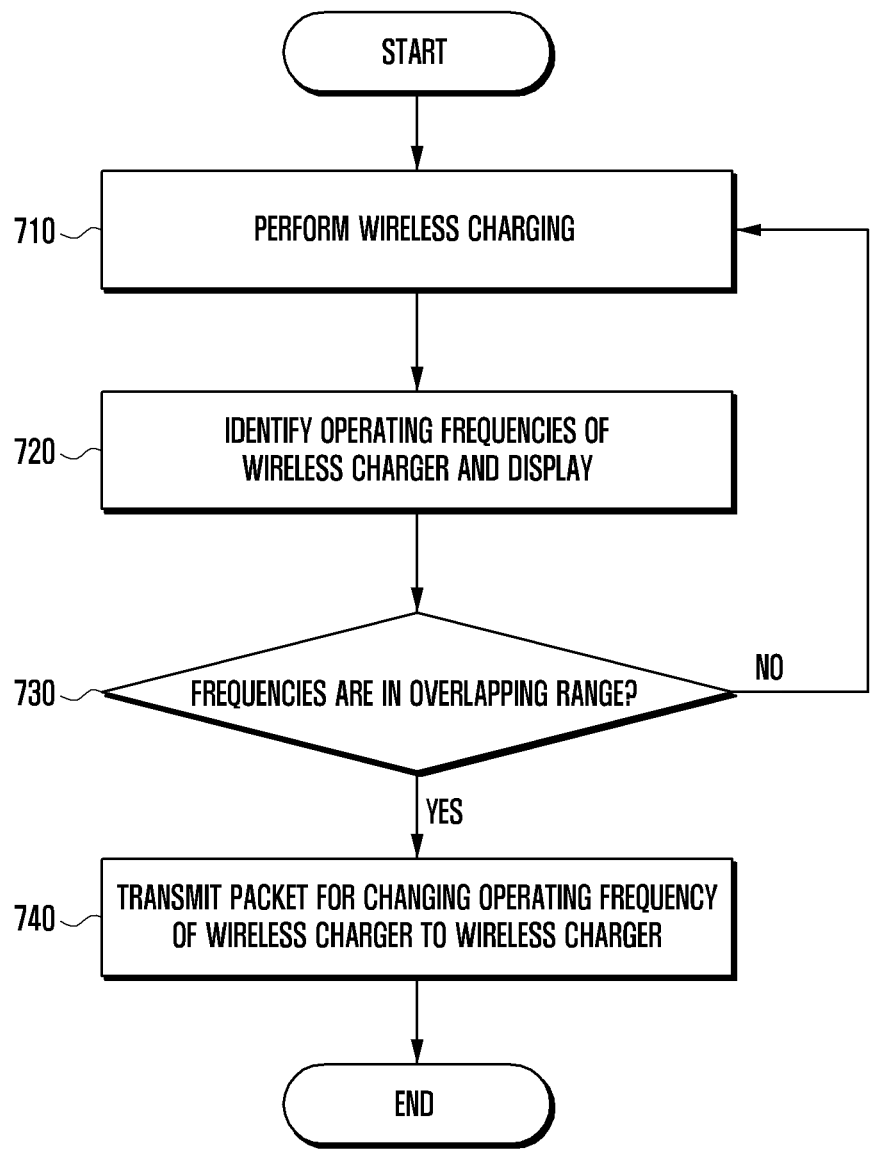
FIG. 7 is a flowchart illustrating a frequency interference cancellation method of an electronic device according to an embodiment.

FIG. 7 is a flowchart illustrating a frequency interference cancellation method of an electronic device according to an embodiment. Specifically, FIG. 7 illustrates a frequency cancellation method that directly adjusts an operating frequency of the wireless charger 400.

Referring to FIG. 7, in step 710, the processor 310 performs wireless charging with power that is wirelessly received from the wireless charger 400.

In step 720, the processor 310 identifies the operating frequencies of the wireless charger 400 and the display 340.

In step 730, the processor 310 determines whether the operating frequencies of the wireless charger 400 and the display 340 fall within an overlapping range that is vulnerable to frequency interference.

If it is determined that the operating frequencies of the wireless charger 400 and the display 340 fall within the overlapping range in step 730, the processor 310 transmits, to the wireless charger 400, via the coil 325, a packet for changing the operating frequency of the wireless charger 400 in step 740. Upon receipt of the packet, the wireless charger 400 may change its operating frequency. For example, the wireless charger 400 may change its operating frequency to protect against occurrence of frequency interference.

However, if it is determined that the frequencies of the wireless charger 400 and the display 340 do not fall within the overlapping range in step 730, the processor 310 continues wireless charging with the power from the wireless charger 400, without changing the operating frequency of the wireless charger 400.

According to an embodiment, an electronic device may include a coil for wireless charging, a wireless power receive circuit electrically connected with the coil, a charging circuit electrically connected with the wireless power receive circuit, a display, and a processor operationally connected with the wireless power receive circuit, the charging circuit, and the display, the processor being configured to control to perform wireless charging with power from a wireless charger, change a charging current of the electronic device from an initial current level to a first current level via the charging circuit based on the display being switched on during wireless charging, change a charging voltage of the electronic device from an initial voltage level to a first voltage level via the wireless power receive circuit, transmit a packet for changing a charging voltage of the wireless charger via the coil based on elapse of a predetermined time period from the change of the charging voltage to the first voltage level, change the charging voltage of the electronic device to a second voltage level via the wireless power receive circuit upon transmission of the packet, and change the charging current to the initial current level.

In the electronic device, the processor may be configured to control to identify operating frequencies of the wireless charger and the display based on the display being switched on during wireless charging, determine whether the operating frequencies of the wireless charger and the display are within an overlapping range vulnerable to frequency interference, and change the charging current of the electronic device 101 from the initial current level to the first current level via the charging circuit 330 based on the operating frequencies being within the overlapping range.

In the electronic device, the processor may be configured to control to determine whether the operating frequency of the wireless charger is variable or fixed and transmit a packet for changing the operating frequency of the wireless charger to the wireless charger via the coil based on the operating frequency of the wireless charger being variable.

In the electronic device, the packet for changing the operating frequency of the wireless charger may be transmitted for changing the operating frequency of the wireless charger to a frequency free from occurrence of frequency interference.

In the electronic device, the processor may be configured to control to transmit the packet for changing the operating frequency of the wireless charger one or more times.

In the electronic device, the second voltage level may be less than the initial voltage level, and the first voltage level may be between the initial voltage level and the second voltage level.

In the electronic device, the processor may be configured to control to change the charging voltage of the electronic device in a stepwise manner by a predetermined voltage interval via the wireless power receive circuit.

In the electronic device, the packet for changing the charging voltage of the wireless charger may be transmitted to change the charging voltage of the wireless charger 40 to be equal to the second voltage level.

In the electronic device, the first current level may be a minimum current level wireless charging.

In the electronic device, the processor may be configured to control to determine whether wireless charging is performed in a high-speed wireless charging mode based on the operating frequencies being within the overlapping range and change the charging current of the electronic device from the initial current level to the first current level based on wireless charging being performed in the high-speed wireless charging mode.

According to an embodiment, a frequency interference cancellation method of an electronic device may include performing wireless charging with power from a wireless charger, changing a charging current of the electronic device from an initial current level to a first current level via a charging circuit based on a display being switched on during wireless charging, changing a charging voltage of the electronic device from an initial voltage level to a first voltage level via a wireless power receive circuit, transmitting a packet for changing a charging voltage of the wireless charger via a coil based on elapse of a predetermined time period from the change of the charging voltage to the first voltage level, changing the charging voltage of the electronic device to a second voltage level via the wireless power receive circuit 320 upon transmission of the packet, and changing the charging current to the initial current level.

Changing the charging current of the electronic device from the initial current level to the first current level may include identifying operating frequencies of the wireless charger and the display based on the display being switched on during wireless charging, determining whether the operating frequencies of the wireless charger and the display are within an overlapping range vulnerable to frequency interference, and changing the charging current of the electronic device from the initial current level to the first current level via the charging circuit based on the operating frequencies being within the overlapping range.

The frequency interference cancellation method of the electronic device may further include determining whether the operating frequency of the wireless charger is variable or fixed and transmitting a packet for changing the operating frequency of the wireless charger to the wireless charger via the coil based on the operating frequency of the wireless charger being variable.

The packet for changing the operating frequency of the wireless charger may be transmitted for changing the operating frequency of the wireless charger to a frequency free from occurrence of frequency interference.

The packet for changing the operating frequency of the wireless charger may be transmitted one or more times.

The second voltage level may be less than the initial voltage level, and the first voltage level may be between the initial voltage level and the second voltage level.

Changing the charging voltage of the electronic device from the initial voltage level to the first voltage level and changing the charging voltage of the electronic device from the first voltage level to the second voltage level may be performed in a stepwise manner by a predetermined voltage interval via the wireless power receive circuit.

The packet for changing the charging voltage of the wireless charger may be transmitted to change the charging voltage of the wireless charger to be equal to the second voltage level.

The first current level may be a minimum current level for wireless charging.

The wireless interference cancellation method of the electronic device may further include determining whether wireless charging is being performed in a high-speed wireless charging mode based on the operating frequencies being within the overlapping range and changing the charging current of the electronic device 101 from the initial current level to the first current level based on wireless charging being performed in the high-speed wireless charging mode.

As described above, an electronic device according to an embodiment is advantageous in terms of preventing a component (e.g., a display or a pen) of the electronic device being charged on a wireless charger from malfunctioning because of a change of the charging voltage of the electronic device or the charging voltage or operating frequency of the wireless charger, upon detecting a situation where interference occurs between the operating frequency of the wireless charger and the operating frequency of the component of the electronic device.

The electronic device is also advantageous in terms of improving the wireless charging operation stability; between a wireless charger and the electronic device being charged on the wireless charger by protecting against malfunction of the electronic device using an algorithm for canceling frequency interference between the wireless charger and the electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the scope of the disclosure as defined by the appended claims and their equivalents.

What is claimed is:

1. An electronic device, comprising:
   a coil;
   a wireless power receive circuit;
   a charging circuit;
   a display; and
   a processor configured to:
     perform wireless charging with power wirelessly received from a wireless charger,
     change, via the charging circuit, a charging current of the electronic device from an initial current level to a first current level, based on the display being switched on during wireless charging,
     change, via the wireless power receive circuit, a charging voltage of the electronic device from an initial voltage level to a first voltage level,
     transmit, via the coil, a packet for changing a charging voltage of the wireless charger,
     change, via the wireless power receive circuit, the charging voltage of the electronic device to a second voltage level upon transmission of the packet, and
     change the charging current to the initial current level.

2. The electronic device of claim 1, wherein the processor is further configured to:

identify operating frequencies of the wireless charger and the display, based on the display being switched on during wireless charging, determine whether the operating frequencies of the wireless charger and the display are within a predetermined overlapping range, and change, via the charging circuit, the charging current of the electronic device from the initial current level to the first current level, in response to the operating frequencies being within the predetermined overlapping range.

3. The electronic device of claim 2, wherein the processor is further configured to:

determine whether wireless charging is performed in a high-speed wireless charging mode, in response to the operating frequencies being within the predetermined overlapping range, and change the charging current of the electronic device from the initial current level to the first current level, in response to wireless charging being performed in the high-speed wireless charging mode.

4. The electronic device of claim 2, wherein the processor is further configured to:

determine whether the operating frequency of the wireless charger is variable or fixed, and transmit, to the wireless charger, via the coil, the packet for changing the operating frequency of the wireless charger, in response to the operating frequency of the wireless charger being variable.

5. The electronic device of claim 4, wherein the packet for changing the operating frequency of the wireless charger changes the operating frequency of the wireless charger to a frequency free from frequency interference with the operating frequency of the display.

6. The electronic device of claim 4, wherein the processor is further configured to transmit the packet for changing the operating frequency of the wireless charger a plurality of times.

7. The electronic device of claim 1, wherein the second voltage level is less than the initial voltage level, and the first voltage level is between the initial voltage level and the second voltage level.

8. The electronic device of claim 7, wherein the processor is further configured to change, via the wireless power receive circuit, the charging voltage of the electronic device in a stepwise manner by a predetermined voltage interval.

9. The electronic device of claim 1, wherein the packet for changing the charging voltage of the wireless charger changes the charging voltage of the wireless charger to be equal to the second voltage level.

10. The electronic device of claim 1, wherein the first current level is a minimum current level for performing wireless charging.

11. The electronic device of claim 1, wherein the processor is further configured to transmit the packet for changing the charging voltage of the wireless charger after a predetermined time period elapses from changing the charging voltage to the first voltage level.

12. A method for canceling frequency interference by an electronic device, the method comprising:

performing wireless charging using power wireless received from a wireless charger;

changing a charging current of the electronic device from an initial current level to a first current level, based on a display being switched on during wireless charging;

changing a charging voltage of the electronic device from an initial voltage level to a first voltage level;

transmitting a packet for changing a charging voltage of the wireless charger after a predetermined time period elapses from changing the charging voltage to the first voltage level;

changing the charging voltage of the electronic device to a second voltage level, response to transmitting the packet; and changing the charging current to the initial current level.

13. The method of claim 12, wherein changing the charging current of the electronic device from the initial current level to the first current level comprises:

identifying operating frequencies of the wireless charger and a display of the electronic device;

determining whether the operating frequencies of the wireless charger and the display are within a predetermined overlapping range; and changing the charging current of the electronic device from the initial current level to the first current level, in response to the operating frequencies being within the predetermined overlapping range.

14. The method of claim 13, further comprising:

determining whether wireless charging is performed in a high-speed wireless charging mode based on the operating frequencies being within the overlapping range; and changing the charging current of the electronic device from the initial current level to the first current level in response to wireless charging being performed in the high-speed wireless charging mode.

15. The method of claim 13, further comprising:

determining whether the operating frequency of the wireless charger is variable or fixed; and transmitting a packet for changing the operating frequency of the wireless charger to the wireless charger in response to the operating frequency of the wireless charger being variable.

16. The method of claim 15, wherein the packet for changing the operating frequency of the wireless charger changes the operating frequency of the wireless charger to a frequency free from frequency interference with the operating frequency of the display.

17. The method of claim 12, wherein the second voltage level is less than the initial voltage level, and the first voltage level is between the initial voltage level and the second voltage level.

18. The method of claim 17, wherein changing the charging voltage of the electronic device from the initial voltage level to the first voltage level and changing the charging voltage of the electronic device from the first voltage level to the second voltage level are performed in a stepwise manner by a predetermined voltage interval.

19. The method of claim 12, wherein the packet for changing the charging voltage of the wireless charger changes the charging voltage of the wireless charger to be equal to the second voltage level.

20. The method of claim 12, wherein the first current level is a minimum current level for wireless charging.

* * * * *